United States Patent
Rowley (10) Patent No.: US 8,326,871 B2
(45) Date of Patent: Dec. 4, 2012

(54) METHOD AND SYSTEM FOR DYNAMICALLY GENERATING CATEGORY-BASED VIEWS

(75) Inventor: Peter Rowley, Mountain View, CA (US)

(73) Assignee: Red Hat, Inc., Raleigh, NC (US)

(*) Notice: Subject to any disclaimer, the term of this patent is extended or adjusted under 35 U.S.C. 154(b) by 353 days.

(21) Appl. No.: 11/679,696

(22) Filed: Feb. 27, 2007

(65) Prior Publication Data
US 2008/0208895 A1    Aug. 28, 2008

(51) Int. Cl.
G06F 17/30 (2006.01)
G06F 7/00 (2006.01)

(52) U.S. Cl. .......................... 707/782; 707/812

(58) Field of Classification Search .......... 707/736, 707/782, 812, 999.002, 999.102–999.106
See application file for complete search history.

(56) References Cited

U.S. PATENT DOCUMENTS

| | | | |
|---|---|---|---|
| 5,287,447 A | | 2/1994 | Miller et al. |
| 6,003,034 A | * | 12/1999 | Tuli .............................. 707/101 |
| 6,587,856 B1 | * | 7/2003 | Srinivasan et al. ................. 1/1 |
| 6,768,988 B2 | | 7/2004 | Boreham et al. |
| 6,775,771 B1 | * | 8/2004 | Shrader et al. ................. 713/167 |
| 7,020,662 B2 | | 3/2006 | Boreham et al. |
| 8,145,845 B2 | * | 3/2012 | Rowley .......................... 711/133 |
| 2003/0088678 A1 | * | 5/2003 | Boreham et al. ............. 709/228 |
| 2003/0135491 A1 | | 7/2003 | Rowley |
| 2004/0010665 A1 | * | 1/2004 | Agarwal et al. ................ 711/154 |
| 2007/0112789 A1 | * | 5/2007 | Harvey et al. ................. 707/100 |

OTHER PUBLICATIONS

WhatIs.com, "SearchMobileComputing.com Definitions", May 3, 2005, http://searchmobilecomputing.techtarget.com/sDefinition/0,,sid40_gci212051,00.html.*

Årnes, André, "Public Key Certificate Revocation Schemes," Thesis for Department of Telematics, Norwegian University of Science and Technology, Queen's University Kingston Ontario, Canada Feb. 2000.

* cited by examiner

Primary Examiner — Jacob F Bétit
Assistant Examiner — Amanda Willis
(74) Attorney, Agent, or Firm — Lowenstein Sandler PC (57) ABSTRACT

Embodiments of the present invention provide a method and system for dynamically creating a view in a distributed processing system. The system can have nodes such as a service node and a directory with entries. An object class of a view can be defined as including an attribute type that accommodates a new attribute value. An attribute value associated with one of the nodes can be received at the service node whereupon it can be determined whether the attribute value is associated with the new attribute value. A new view can be created if the attribute value is associated with the new attribute value.

16 Claims, 7 Drawing Sheets

METHOD AND SYSTEM FOR DYNAMICALLY GENERATING CATEGORY-BASED VIEWS

FIELD OF THE INVENTION

The present invention relates generally to directory services and more particularly to providing directory views that change dynamically based on the addition of new attributes associated with entries in a directory.

BACKGROUND OF THE INVENTION

Within modern enterprises, large numbers of individuals and organizations are present each having different functions, organizational associations, group affiliations, and the like. A directory service can provide a repository of information about the individuals, organizations, services, affiliations and resources within an enterprise according to a particular structure that facilitates management and communication within the enterprise. In an enterprise network environment for example, a directory service can identify network users, installed software, installed hardware, permissions, and the like. Subsequent access to information can be accomplished without particular knowledge of certain aspects such as physical location or the like.

In order to provide a more uniform and wide ranging standard, access to directory information for example in complex heterogeneous computer networks is governed by standards such as those established by the International Telecommunications Unions (ITU). One such standard is the so-called directory access protocol (DAP) specified under the X.500 standard and also the international standards organization (ISO) under the ISO/IEC 9594 standard. The above noted standards provide a universal structure for electronic directories of, for example, nodes in an enterprise so that the information can become part of a global directory available to anyone in the world having access to the Internet. In accordance with X.500, a directory system agent (DSA) hosts a hierarchical database for storing the directory information for expeditious search and retrieval of information with multiple DSAs capable of being interconnected. Clients or users can access directory information through the use of an application known as a directory user agent (DUA). In a typical installation, a DUA can provide a capability for simple inquiries and can also include more features such as a graphical user interface (GUI) or the like. A directory system protocol (DSP) is also specified to control interaction between DSAs, and DUAs and DSAs such that an end user can access information in the directory without needing to know the exact location of that specific piece of information.

In accordance with X.500, each site is only responsible for its local Directory portion and as a result, updates and maintenance can be done instantly. Directory services under X.500 further provide powerful searching facilities that allow users to construct arbitrarily complex queries. Directory services under X.500 are further provided using a single homogeneous namespace to users such as under domain name service (DNS). Directory services under X.500 are defined using a structured information framework that allows for local extensions. Still further, X.500 compliant directory service can provide resident applications that require directory information, such as e-mail applications, automated resources locator applications, and special-purpose directory tools with access to huge amounts of information in accordance with a uniform structure. Since fully featured X.500 directory can be complex to implement, the lightweight directory access protocol (LDAP) was developed to provide less complex implementation. LDAP is a TCP/IP-based version of DAP primarily for use on the Internet. While much of the functionality of DAP is preserved, LDAP can be configured to query data from various proprietary and open X.500 directory services. While LDAP compliant directory services can provide standard interaction between clients having queries and other LDAP compliant servers, problems can arise in that based on the structure of the directory information tree, navigation of entries or changes to the hierarchical structure becomes difficult.

It is understood that directory services applications, and particularly user interface applications or GUIs, are typically programmed using object-oriented methodologies since object-oriented languages allow reusability and scalability of code. As will be appreciated, object-oriented GUI applications are programmed using objects. In the context of object-oriented programming, an object is a data-centric construct or abstraction that can be used to define and control the operation of the application in terms of fundamental units. For example, in an object oriented application for managing a doctor's office, one type of object might include a "patient" object. The patient object then consists of data associated with the patient such as address and account data and operations performed on the data such as billing operations and account management operations.

A typical object includes a collection of operations or methods and data or attributes that can be unique to the object and that define a set of behaviors that the object can perform or behaviors that can be performed on the object. The class of an object defines a group characteristic of an object based on one or more common properties shared by the group. For example a patient object is of the class patient. Another class of object might include "caregiver." An instance of the object would be a particular patient object or caregiver object corresponding to an individual patient or caregiver. A class definition can define methods for constructing new object instances and also for determining the behavior of each instance of the object, which define how each instance behaves.

The class definition also includes attributes that define particular features of an instance of an object such as a salary. Object-oriented applications can include objects that may generally be divided roughly into three object types: model objects, view objects, and controller objects. Model objects generally handle operations such as manipulating data. View objects are used to support graphical presentation such as the content and operation of the GUI. Lastly, controller objects can be used handle interaction between model objects and view objects including input from external input devices such as keyboards and pointing devices. In connection with view objects, container objects can be used to represent data in structures such as folders, drawers, and file cabinets normally associated with a GUI.

Views in an LDAP directory services environment include sets of attribute information associated with an LDAP directory entry that are available to be "viewed," for example, by a particular software application, a user, or the like. Views can be filtered depending on access permission levels or on organizational function and can be limited or expanded based on parameters such as permission levels, organizational functions, and the like. As described, an attribute is a value that describes one characteristic of an object, which can have many attributes associated with it. In a large enterprise, as people are added, move and depart from organizations, and as organizations change and are added or removed from an enterprise, attributes associated with objects in the enterprise change.

In view of the above explanations, problems can arise in that, as new attributes are added to objects within a directory, or as new container objects are added to represent changes to the enterprise, they may not be readily available to certain views within available within the enterprise. Accordingly, when changes occur to the actual structural hierarchy of the directory in terms of container objects and attributes, changes to the view should also occur. Such changes can be difficult to represent particularly in real time. In security environments, such as PKI environments, the need to accurately reflect the current state of the directory in terms of container objects further amplifies the need for rapid directory updates since failure to accurately represent the network state can lead to vulnerabilities that can be exploited.

While a general background including problems in the art are described hereinabove, with occasional reference to related art or general concepts associated with the present invention, the above description is not intending to be limiting since the primary features of the present invention will be set forth in the description which follows. Some aspects of the present invention not specifically described herein may become obvious after a review of the attendant description, or may be learned by practice of the invention. Accordingly, it is to be understood that both the foregoing general description and the following detailed description are exemplary and explanatory only in nature and are not restrictive of the scope or applicability of the present invention.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide a method and system for dynamically creating a view in a distributed processing system. The system, such as an enterprise, can have a plurality of nodes including a service node and a directory with entries associated with the nodes. In accordance with various embodiments, an object class of the view can be defined as including an attribute type that accommodates a new attribute value associated with the attribute type.

An attribute value associated with one of the nodes in the distributed processing system can be received at the service node such as through an email transmission or the like containing the attribute value. It can then be determined whether the attribute value is associated with the new attribute value, for example, as defined in connection with the attribute type. A new view can be dynamically created if the attribute value is associated with the new attribute value. Further, an existing view can be dynamically updated if the attribute value is currently associated with the existing view, such as when the new view is dynamically created. It should be noted that operations such as creating the new view, defining the object class of the view, or the like can be performed in accordance with a lightweight directory access protocol (LDAP). The directory can include a hierarchical tree directory, an active directory, a lightweight directory access protocol (LDAP) directory, an X.500 directory, or the like. In some embodiments, the attribute can include a virtual attribute and accordingly, determining whether the attribute value has an attribute format associated with an existing container object includes searching an index of virtual attributes.

In other embodiments, a local node can be provided in a distributed computer network. The local node can include a network interface coupled to the distributed computer network and a storage device for storing a directory. The directory can include one or more entries associated with an existing view. An object class of the view can be defined as including an attribute type that accommodates a new attribute value associated with the attribute type. A processor coupled to the network interface and the storage device can be configured to receive an attribute value from a node in the distributed computer network, including an internal source and process the received attribute value to automatically create a new view based on the attribute value if the attribute value is associated with the new attribute value, such as if the attribute value is of the attribute type that accommodates the new attribute value. The local node can include a display coupled to the processor such that the processor can be configured to display the new view on the display. Alternatively, the processor can be configured to process the received attribute to update the existing view if the attribute value is not associated with the new attribute value, such as if the attribute value is associated with the existing view. In some embodiments, the attribute includes a virtual attribute. The processor can therefore be further configured to search a virtual index of virtual attributes to determine if the virtual attribute is included in the directory.

In still other embodiments, a directory server can be provided in a distributed processing system. The directory server can include a storage device for storing a directory, such as an Active Directory, that is configured in accordance with a protocol, such as an LDAP protocol. The directory server can also include a network interface coupled to a network that includes nodes having entries associated therewith that are stored in the directory. The entries can be associated with an existing view and an object class of the view can be defined as including an attribute type that accommodates a new attribute value associated with the attribute type. A processor can be coupled to the storage device and the network interface and can be configured to determine if an attribute value received from one of the nodes over the network interface, such as through an email or the like, is associated with the existing view. If the attribute value is determined not to be associated with the existing view, a new view can be added including the new attribute value. Alternatively, the processor can be configured to update the existing view if the attribute value is determined to be associated with the existing view.

Reference will now be made in detail to exemplary embodiments of the invention, which are illustrated in the accompanying drawings. Wherever possible, the same reference numbers will be used throughout the drawings to refer to the same or like parts.

Figure 1:
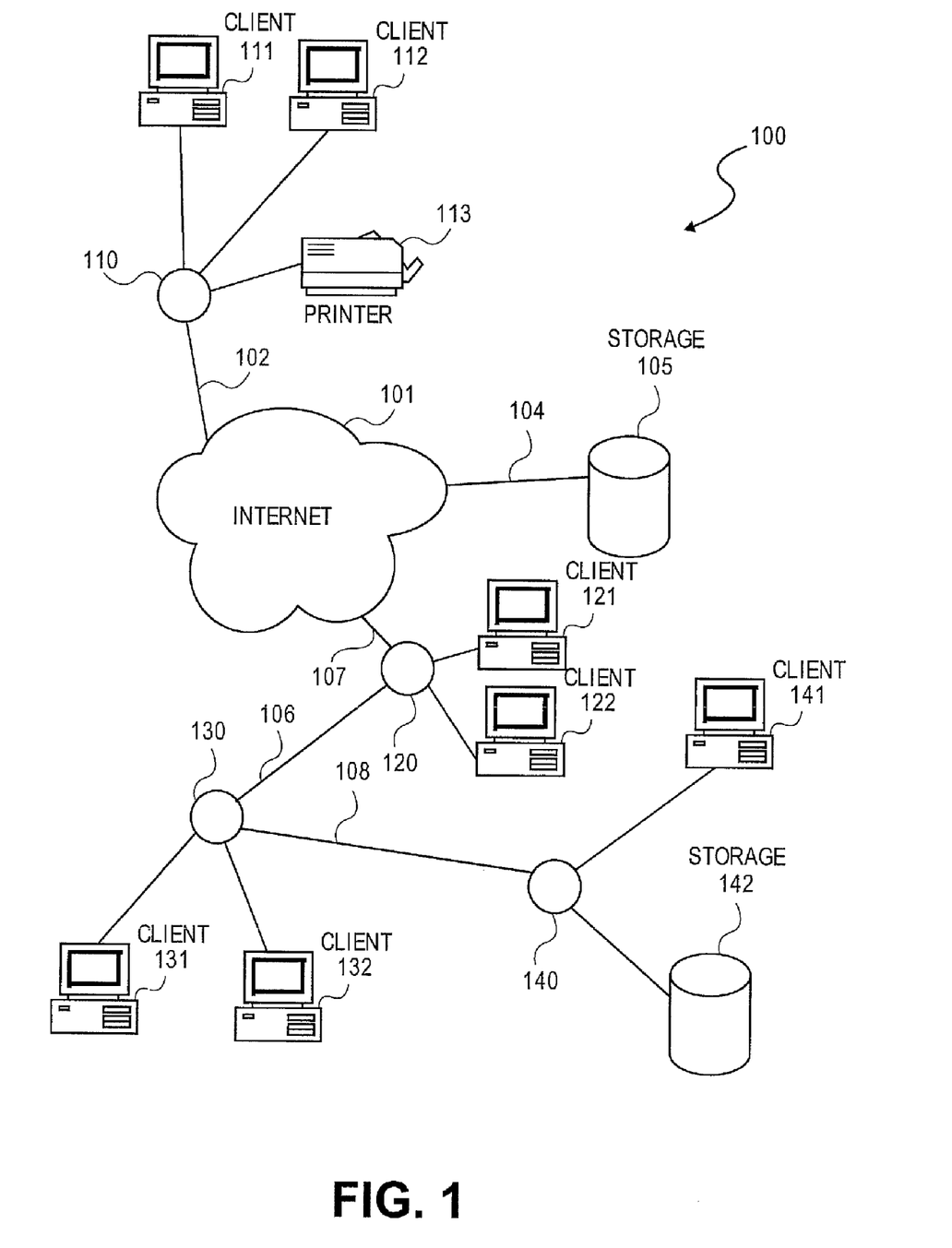
FIG. 1 is a diagram illustrating an exemplary enterprise environment including network connections.

Referring now to FIG. 1, a simplified and representative heterogonous computing environment 100 associated with, for example, an enterprise computer system will be discussed and described. The basic representative environment 100 includes several nodes 110, 120, 130 and 140. It will be appreciated that nodes 110-140 may correspond to enterprise servers, hubs or the like within the enterprise including remote nodes that are separated from each other by a private network and/or a public network 101 such as the internet. Each of the nodes 110-140 can have clients associated therewith, and, for illustrative purposes, client 110 can have a client 111 and client 112 connected thereto, and other devices such as, for example, a network printer 113. Node 110 can be connected to network 101 through a network connection 102. It will be appreciated that all connections shown herein can be wired connections, either through, for example, metal cable, coaxial cable, fiber optical cable or the like, or wireless connection as will be appreciated. Node 120 can have a client 121 and a client 122 connected thereto, node 130 can have a client 131 and a client 132 connected thereto and node 140 can have a client 141 and other devices such as a storage device 142 connected thereto. It will further be appreciated that the enterprise can also include, for example, a storage device 105 that is accessible through network 101 using connection 104.

Figure 2:
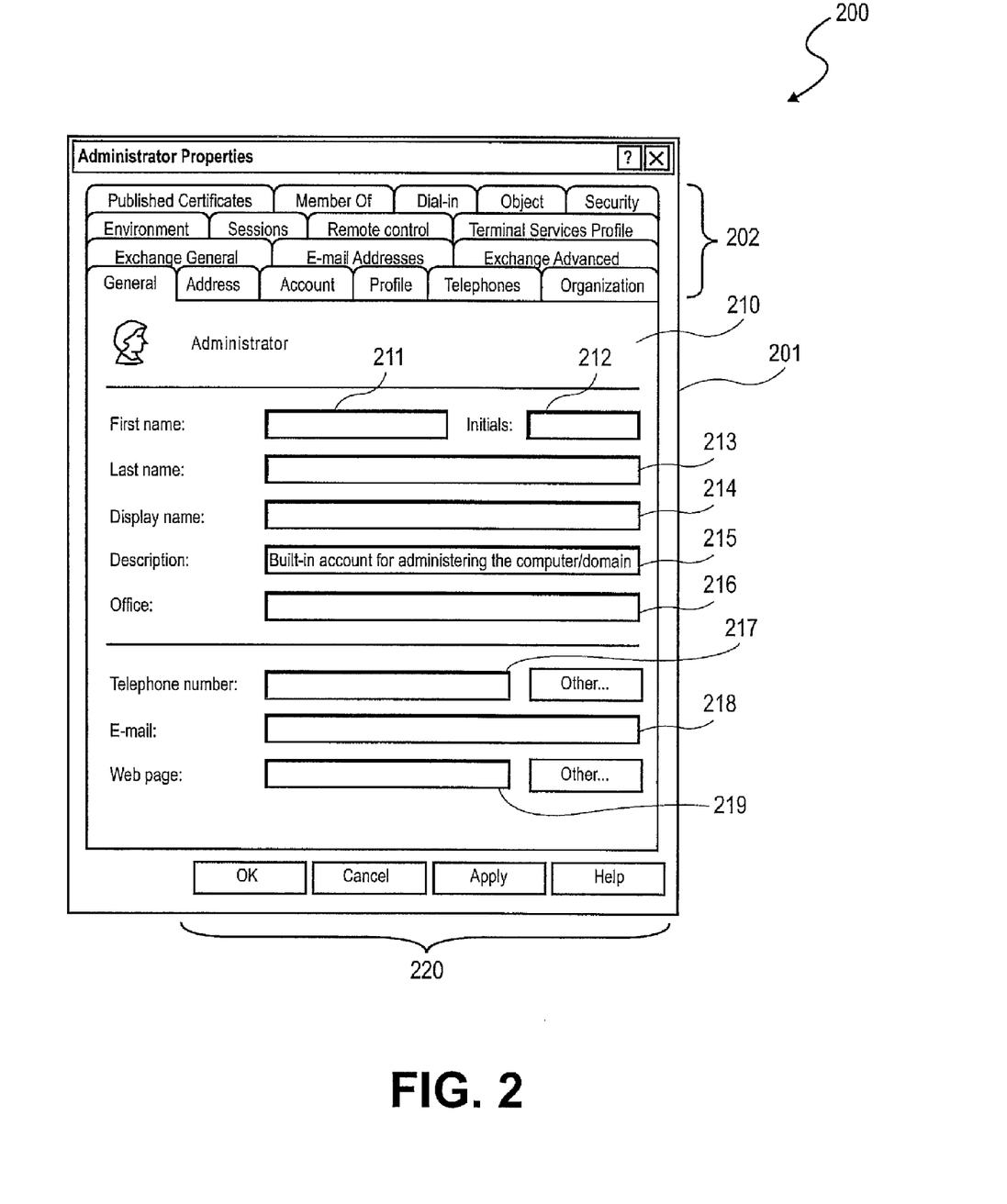
FIG. 2 is a diagram illustrating a control for entering information associated with a directory entry consistent with embodiments of the present invention.

To manage information about the various configurations of the enterprise environment 100, particularly in environments where security is of importance, directory services can be provided to configure and display various aspects of the enterprise network. In connection with FIG. 1, therefore, it will be appreciated that the various nodes 110-140 can be considered as servers capable of operating, for example, as directory system agents (DSAs), which are correspondingly configured to manage directory information associated with their respective portions of the enterprise network. Information associated with users, administrators, devices, domain controllers and the like can all be configured as shown, for example, in FIG. 2, which shows an exemplary environment 200 for entering information into a directory services application in connection with an administrator entry. Window 201 contains various text entry boxes for entering property information for each of a variety of properties associated with an administrator that can be represented by tabs 202. In connection with the "general" tab 210, as shown, information such as First name 211, Initials 212, Last name 213, Display name 214, Description 215, Office 216, Telephone number 217, E-mail 218, and Web page 219 can all be entered in connection with an Administrator. It will be appreciated that additional tabs can be selected to show or enter additional information such as Published Certificates, Member Of, Dial-in, Object, Security, Environment, Sessions, Remote control, Terminal Services Profile, Exchange General, E-mail Addresses, Exchange Advanced, Address, Account, Profile, Telephones, and Organization tabs, which information should be self-explanatory to one of skill in the art. Once information is entered or if the window is accessed for viewing only or by mistake, control buttons 220 can be used to acknowledge actions, cancel actions, apply settings to seek help, or the like. It will also be appreciated that while window 201 is shown in connection with settings for an Administrator, other windows are provided for settings for other entities within the enterprise for which directory services are provided. Once entered the information associated with the Administrator entry can be used to populate a directory object associated with the particular Administrator entry and information about the Administrator can appear in a directory view. Also, based on the information associated with the Administrator, certain views may be available to the Administrator that may not be available to other objects.

Figure 3:
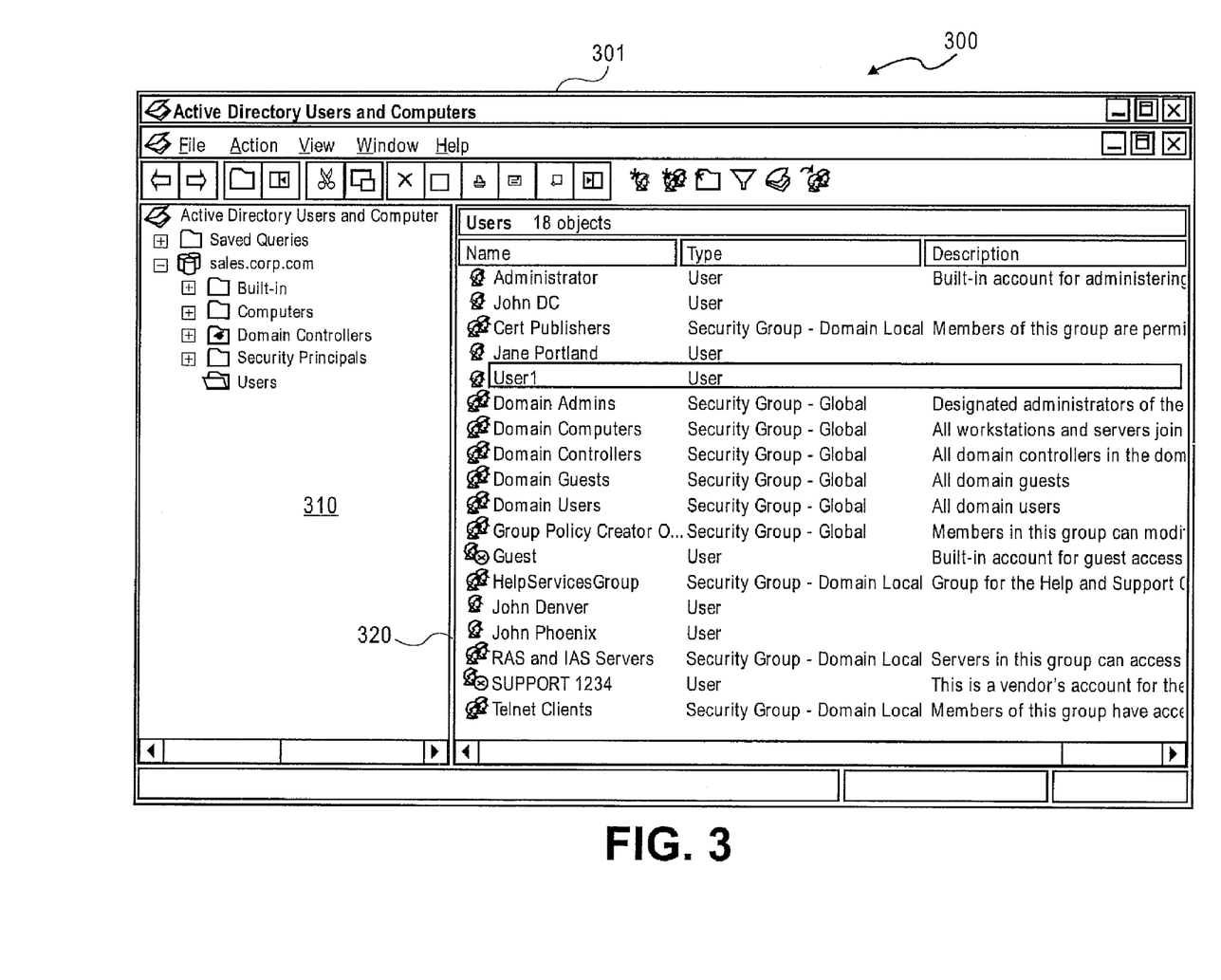
FIG. 3 is a diagram illustrating a directory view of portions of an exemplary container object consistent with embodiments of the present invention.

In connection with the entities associated with an exemplary enterprise operating with directory services, and as described above, information about the attributes of directory entries can be provided in various views. Views or container objects are shown in an exemplary scenario 300 illustrated in FIG. 3. Window 301 can be thought of as a view or views or a container object or series of container objects associated with an Active Directory listing of the users and computers in the enterprise. In view 310 a hierarchy of the various categories of entities in the enterprise is shown, while 320 shows a detailed view of the individual components or views within the Users category. It should be noted that, depending on the various roles of individuals interacting with the directory services applications, and depending on how view objects are defined including attribute types and view filters, different views are possible as are different capabilities to input and/or modify information associated with a directory entry. It will be understood that certain permissions are required to view, access and modify information particularly where security information is involved. When new information is necessary for an existing object, new attributes can be applied or entirely new view objects generated for attributes that have not been previously accounted for.

Figure 4:
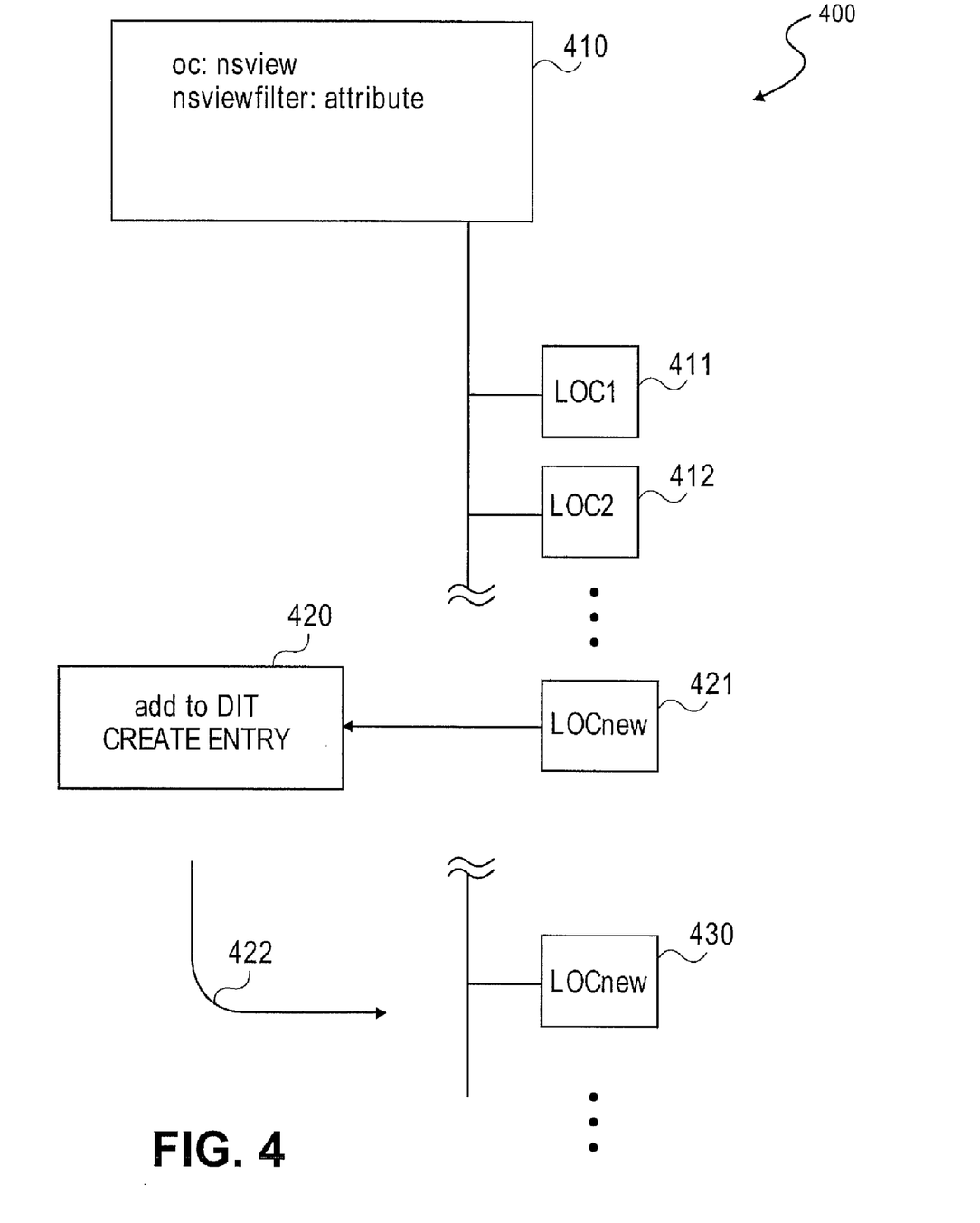
FIG. 4 is a diagram illustrating an exemplary view with manual addition of a new attribute.

To better appreciate how a new attribute is manually added to a view a scenario 400 is shown in FIG. 4. A view 410 is an object as will be understood by one of skill in the art, and in the present example is of the object class "nsview." The view 410 through the use of, for example, a filter specification such as "nsviewfilter" can be used to determine which attributes are displayed. In the present example the attribute can be location. As illustrated, LOC1 411 and LOC2 412 fit the parameters of nsviewfilter and thus appear in the view associated with view 410. For a new location to be added to the view 410, entry information such as LOCnew attribute information 421 must be added to the directory or directory information tree (DIT) such as in process 420. After the entry associated with LOCnew 421 is added, information 422 about the entry can be used to update the view 410 such that a LOCnew 430 attribute can be included in view 410. It will be appreciated that in generating new information for a directory, certain steps can be followed such as connecting to the directory container that will store the new object; creating the object; setting the object's required attributes, if necessary; and saving or commit the new object to the directory. The steps are generally performed using scripts that require updating the directory and the views and include LDAP commands such as "ldapadd," or the like that will be familiar to those of ordinary skill in the art. Also, a record can be added as a file such as a "*.ldif" file or the like. Thus, problems arise when new attributes are added to an object or when an entirely new object class is created. Until the objects or attributes are added to the directory, the new attributes may not be available to the directory views.

An exemplary table of common characteristics of an LDAP attribute is shown in Table 1. It can be seen that the definition of an attribute itself contains attributes. It will be appreciated that some of the attributes such as the common name are required while others are not required. Still further, in some scenario virtual attributes can be used, for example, as place holders or the like in anticipation of values yet to be obtained or to simulate values. Indexes of virtual attributes may also be used as a way to categorize and search attributes in a directory oriented application such as a directory services application or the like. It should be noted that while Table 1 contains many of the common definitions, additional definitions can be contemplated that fall within the scope of the invention, particularly given that the present invention is intended to accommodate the addition of new attributes and container objects and the like. It will also be appreciated that in some cases, attributes generated internally, such as through a plug-in software module or the like may be useful.

TABLE 1

LDAP Attribute definition

| Attribute | Description |
| --- | --- |
| Access-Category | The access control category of this attribute type |
| Attribute-ID | The internal attribute Id that this record governs |
| Attribute-Syntax | Identifies the data representation syntax |
| Common-Name | X.500 Common Name (DN of this object) |
| Extended-Chars-Allowed | =1 Extended characters allowed, =0 not allowed. |
| Is-Single-Valued | Indicates if the attribute is single or multi-valued |
| LDAP-Display-Name | LDAP display name for the attribute |
| Link-ID | Identifies links and back-links (DL=>Member & Mailbox=>Is-Member-Of) |
| MAPI-ID | The MAPI ID of this attribute |
| OID-Type | Specifies the Object ID type in the scripts. |
| OM-Object-Class | The XAPIA OM Object class of this attribute (if it has one) |
| OM-Syntax | The XAPIA OM Syntax of this attribute |
| Range-Lower | Minimum size for attribute value |
| Range-Upper | Maximum size for attribute value |
| Schema-Flags | The flags for the attribute (replicate to other site or not etc.) |
| Search-Flags | TRUE will cause the DS to generate a fast search index. |

Figure 5:
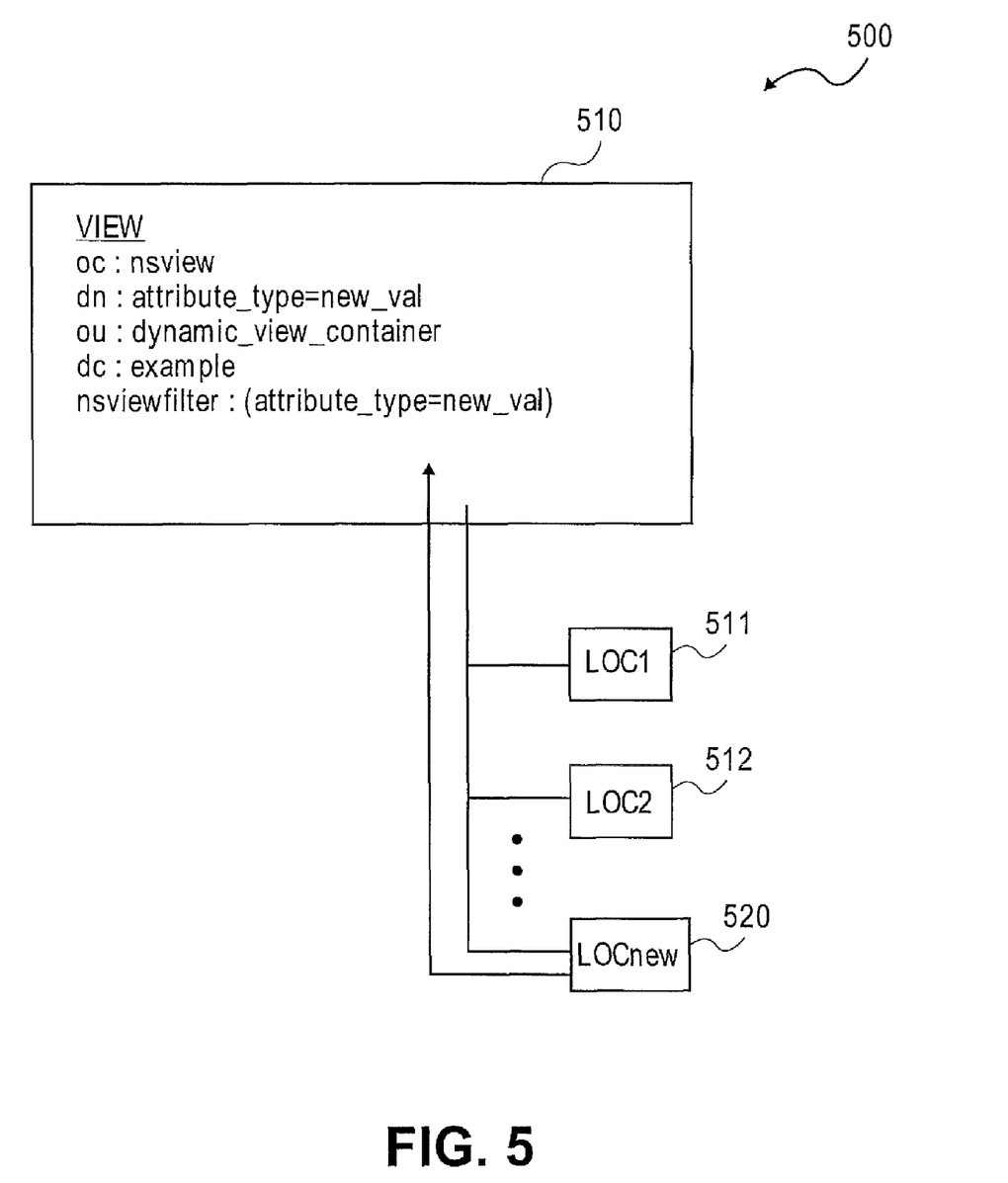
FIG. 5 is a diagram illustrating an exemplary container object with dynamic view update consistent with embodiments of the present invention.

To better illustrate the dynamic update of views, such as category based view, a view scenario 500 with respect to an exemplary location attribute is shown in FIG. 5. A view 510 corresponding to for example, a top level view object can be defined so as to accommodate new attributes as they are added in the directory, such as an email directory or the like. Accordingly, view 510 can contain an object class descriptor oc: indicating an object class of "nsview." However, unlike the previous nsview definition, for example, in connection with view 401, the view object class definition for view 510 can be modified in accordance with the invention. The view 510 can thus include a distinguished name or "dn:" of "attribute_type" which in turn is defined as equal to "new_val." It will be appreciated that dn identifies information about attributes to be used in view searches to populate the view as defined for example by the nsviewfilter parameter, which, in the present example, is also attribute_type=new_val. It will be appreciated that the view 510 may also include descriptors such as the organizational unit "ou" descriptor shown as "dynamic_view_container," and the domain component "dc" descriptor shown as "example," however, the attribute_type=new_val definition provides the association between attributes shown in the view and the ability to display a new attribute value. For example, it can be seen that the view 510 includes LOC1 511 and LOC2 512 as determined for example, by the contents of the nsviewfilter definition. If a new location attribute is included in the directory, such as a LOCnew 520, then in accordance with the definition attribute_type=new_val, the new value LOCnew 520 will dynamically appear in the view 510 without the need to separately create and define the LOCnew 520 as described above in connection with FIG. 4.

It should be noted that the contents of view 510 are shown for illustrative purposes only and should not be considered as limiting the present invention to the descriptors used in the example. Rather the present invention can be applied to any view object, or other object or object class, instantiation, or the like, to dynamically accommodate new attributes without the need for separate entry or addition to a directory.

A procedure and system to allow for dynamically updating views when object attributes, such as container object attributes, change can be advantageous. Thus, when a new attribute is learned of, such as through a communication received from an entity with an attribute not presently listed in a directory associated with a DSA for that portion, the view can be automatically updated. It is possible to construct an object class as will be described with function or method or other definition for the object class to dynamically include the new attribute and possibly to define and create a new container object associated with the attribute. For example, if a new office location associated with an enterprise is opened, a new value for the attribute associated with, for example, location can be established and all views to container objects displaying the attribute can be dynamically updated to reflect the new attribute, or the like.

Figure 6:
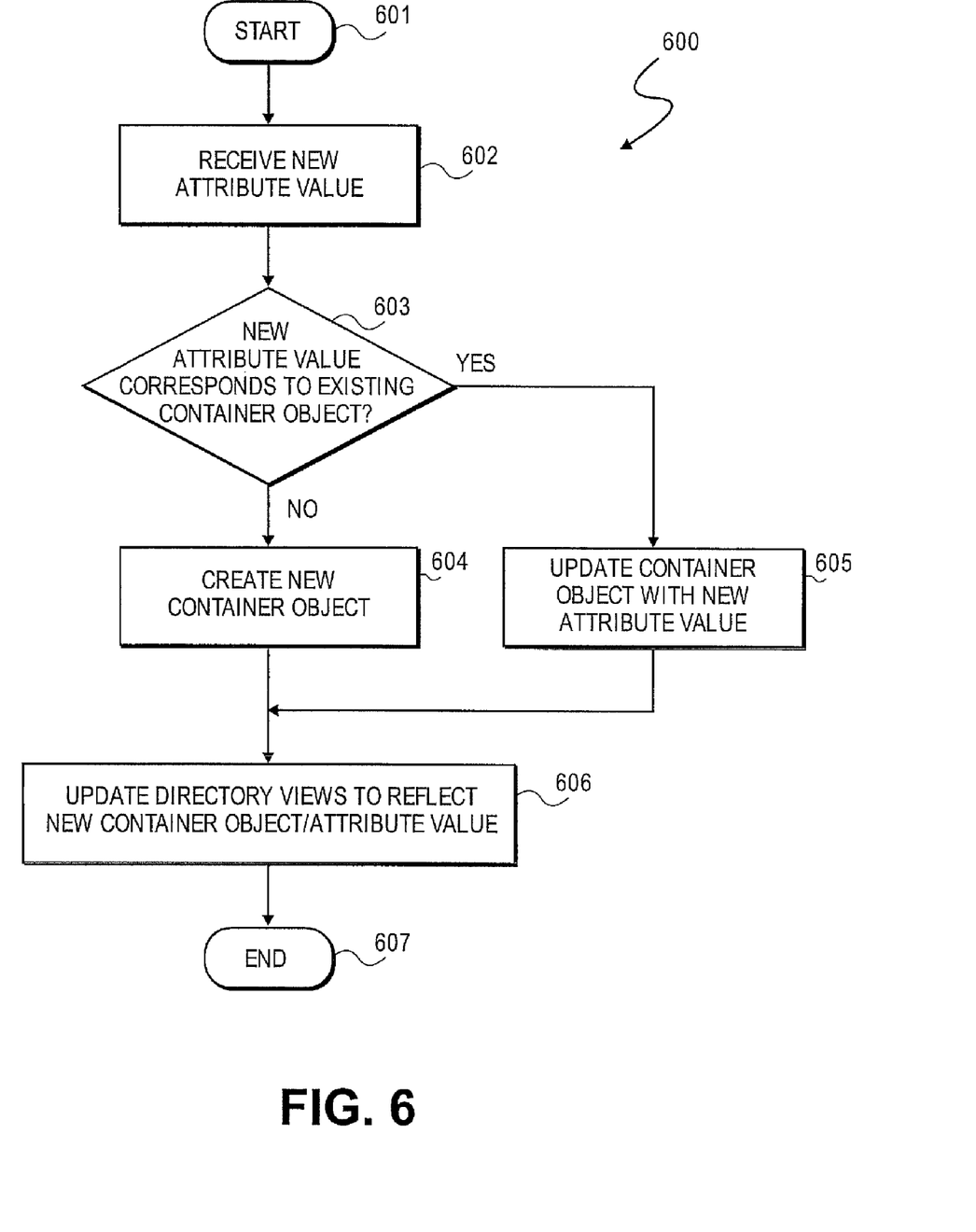
FIG. 6 is a flowchart illustrating exemplary procedures for generating updated views consistent with embodiments of the present invention.

Accordingly, the exemplary procedure 600 can be described as a series of procedures or steps that can occur in connection with a software program, or a combination of software and hardware interaction or the like. After start at 601, a new attribute value can be received at 602. A determination can be made at 603 as to whether the new attribute is associated with an existing container object. If not a new container object can be created at 604. If a container object already exists, then the container object can be updated at 605 with the new attribute value. When the new container object is created or the existing object is updated, the directory view or views can be updated to reflect the new container object/attribute value at 606. While the exemplary procedure is indicated as ending at 607, it will be appreciated that the procedure can be repeated as often as necessary or even continuously to address new attributes that are received.

Figure 7:
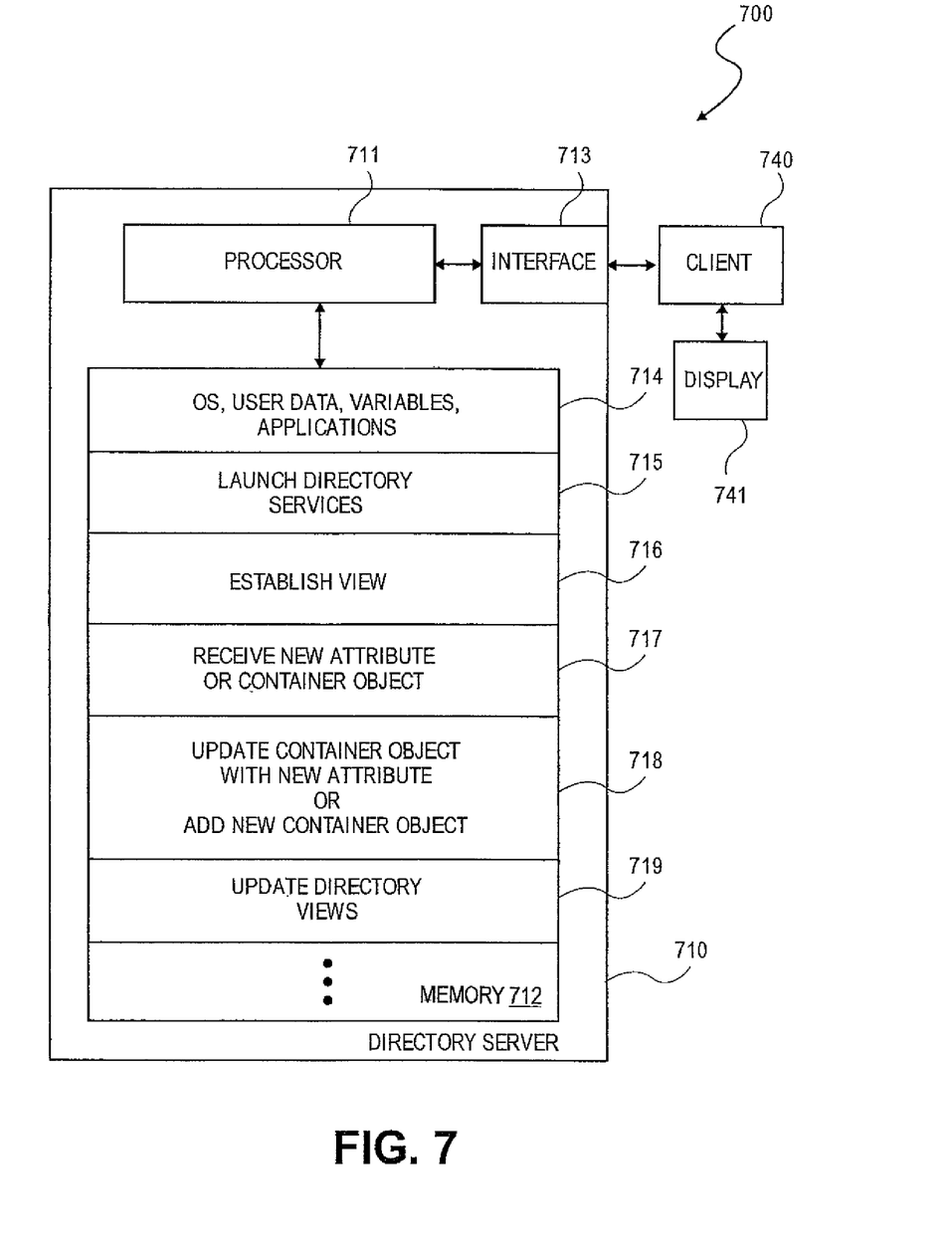
FIG. 7 is a diagram illustrating an exemplary directory server for generating updated views consistent with embodiments of the present invention.

It will be appreciated by those of ordinary skill that the present invention can be embodied, for example in scenario 700 as shown in FIG. 7 as a general or dedicated computer system having a processor and memory, or the like. In one such embodiment an exemplary directory server 710 can be provided with a processor 711 a memory 712 and an interface 713 for, for example, coupling to a network such as an enterprise network including enterprise clients such as client 740 having a display 741 upon which, for example, views can be displayed. The processor 711 can communicate with the memory 712 through for example a bus or the like to load and execute instructions for causing processors 711 to carry out various procedures in accordance with the invention. For example, during initialization the enterprise server 710 can execute instructions in the memory 712 to load an operating system, data, variables, and application code and the like at 714. At 715 instructions can be executed that cause the processor to launch a directory services application associated with information about the enterprise clients. The directory services application can establish a directory view or views at 716 that can be displayed for example on display 741 of client 740. The contents of the view in terms of attributes displayed will, as described, depend on the entity to which the view is presented. A user entity, for example, will have a limited view of attributes, while an administrator view will contain more attributes not available to the user view. When a new attribute is received such through an email from a new office within the enterprise at 717, an existing container object can be updated with the new attribute or a new container object can be added to accommodate the new attribute at 718. When updates associated with the new attributes are performed, the directory views as appropriate can be updated at 719. For example, if the new attribute is a user attribute, user views can be updated to reflect the new attribute. On the other hand, if the new attribute is a DSA specific attribute, only the DSA administrator view will be updated.

Other embodiments of the invention will be apparent to those skilled in the art from consideration of the specification and practice of the invention disclosed herein. It is intended that the specification and illustrations contained therein be considered as exemplary, with the scope and spirit of the invention being indicated by the following claims.

What is claimed is:

1. A method of dynamically updating a view in a distributed processing system having a node and a directory information tree with entries associated with the node, comprising:
   creating a view object class for a view object in a lightweight directory access protocol (LDAP) service environment;
   creating a distinguished name (DN) for a view object class definition for the view object class, the DN having a value of an attribute type equal to new attribute value to identify attribute information to be used to populate the view;
   defining a view filter for the view object, the view filter having a value same as the value of the DN to determine which attributes values are to be displayed in the view;
   receiving, by the node, an attribute value;
   examining the view object class definition to determine that the received attribute value is defined in connection with the DN value of attribute type equal to new attribute value;
   dynamically updating the view by a processor of the node in response to the determination that the received attribute value is defined in connection with the DN value of attribute type equal to new attribute value, wherein the view that was updated comprises the received attribute value, and wherein the view is updated without the received attribute value being defined in the entries of the directory information tree; and
   providing the view that was updated to a user of the distributed processing system.

2. The method of claim 1 wherein the view object class comprises the attribute type for accommodating a new attribute value.

3. The method of claim 1, wherein the directory information tree comprises at least one of a hierarchical tree directory, a lightweight directory access protocol (LDAP) directory information tree, and an X.500 directory information tree.

4. The method of claim 1, wherein the received attribute value comprises a virtual attribute and the method further comprises:
   searching an index of virtual attributes to determine that the received attribute value is defined in connection with the DN value of attribute type equal to new attribute value.

5. The method of claim 1, wherein providing the view that was updated comprises displaying the attribute value on a display coupled to the processor.

6. A non-transitory computer-readable medium having instructions readable and executable by a processor, and, when read and executed, for causing a processor to perform the method comprising:
   creating a view object class for a view object in a lightweight directory access protocol (LDAP) service environment;
   creating a distinguished name (DN) for a view object class definition for the view object class, the DN having a value of an attribute type equal to new attribute value to identify attribute information to be used to populate the view;
   defining a view filter for the view object, the view filter having a value same as the value of the DN to determine which attributes values are to be displayed in the view;
   receiving, by the node, an attribute value;
   examining the view object class definition to determine that the received attribute value is defined in connection with the DN value of attribute type equal to new attribute value;
   dynamically updating the view by a processor of the node in response to the determination that the received attribute value is defined in connection with the DN value of attribute type equal to new attribute value, wherein the view that was updated comprises the received attribute value, and wherein the view is updated without the received attribute value being defined in the entries of the directory information tree; and
   providing the view that was updated to a user of the distributed processing system.

7. The computer-readable medium of claim 6, wherein the received attribute value comprises a virtual attribute and the method further comprises:
   searching an index of virtual attributes to determine that the received attribute value is defined in connection with the DN value of attribute type equal to new attribute value.

8. A distributed computer network having a plurality of nodes, the nodes comprising:
   one or more network interfaces coupled to the distributed computer network;
   one or more storage devices that store one or more directory information trees comprising one or more entries associated with an existing view; and
   a processor coupled to the one or more network interfaces and the one or more storage devices, wherein the processor:
   creates a view object class for a view object in a lightweight directory access protocol (LDAP) service environment;
   creates a distinguished name (DN) for a view object class definition for the view object class, the DN having a value of an attribute type equal to new attribute value to identify attribute information to be used to populate the view;
   defines a view filter for the view object, the view filter having a value same as the value of the DN to determine which attributes values are to be displayed in the view;
   receives an attribute value from one of the nodes in the distributed computer network, wherein the attribute value is defined in connection with the DN value of attribute type equal to new attribute value;
   examines the view object class definition to determine that the received attribute value is defined in connection with the DN value of attribute type equal to new attribute value;
   processes the received attribute value to update the existing view with the received attribute value in response to the determination that the received attribute value is defined in connection with the DN value of attribute type equal to new attribute value, wherein the existing view is updated without the received attribute value being defined in the one or more entries of any of the one or more directory information trees; and
   provides the existing view that was updated to a user of the distributed computer network.

9. The distributed computer network of claim 8, further comprising a display coupled to the processor, wherein the processor displays the received attribute value in the existing view that was updated on the display.

10. The distributed computer network of claim 8, wherein the received attribute value comprises a virtual attribute.

11. The distributed computer network of claim 10, wherein the processor searches a virtual index of virtual attributes to determine if the virtual attribute is included in the one or more directory information trees.

12. A distributed processing system having one or more directory servers, the one or more directory servers comprising:
   one or more storage devices that store one or more directory information trees;
   one or more network interfaces coupled to a network, the network comprising nodes having entries associated therewith that are stored in the one or more directory information trees, wherein the entries are associated with an existing view; and
   a processor coupled to the one or more storage devices and the network interfaces, wherein the processor:
   creates a view object class for a view object in a lightweight directory access protocol (LDAP) service environment;
   creates a distinguished name (DN) for a view object class definition for the view object class, the DN having a value of an attribute type equal to new attribute value to identify attribute information to be used to populate the view;
   defines a view filter for the view object, the view filter having a value same as the value of the DN to determine which attributes values are to be displayed in the view;
   receives an attribute value from one of the nodes over the one or more network interfaces, wherein the attribute value is defined in connection with the DN value of attribute type equal to new attribute value;
   examines the view object class definition to determine that the received attribute value is defined in connection with the DN value of attribute type equal to new attribute value;
   updates the existing view with the received attribute value in response to the determination that the received attribute value is defined in connection with the DN value of attribute type equal to new attribute value without the received attribute value being defined in the entries associated with any of the one or more directory information trees; and
   provides the existing view that was updated to a user of the distributed processing system.

13. The distributed processing system of claim 12, wherein the one or more directory information trees are configured in accordance with a lightweight directory access protocol (LDAP).

14. The distributed processing system of claim 12, wherein the one or more directory information trees comprise at least one of a hierarchical tree directory, a lightweight directory access protocol (LDAP) directory information tree, and an X.500 directory information tree.

15. The distributed processing system of claim 12, wherein the processor receives the attribute value via an email sent from the one node.

16. The distributed computer network of claim 12, further comprising a display coupled to the processor, wherein the processor displays the received attribute value in the existing view that was updated on the display.

* * * * *